US008965759B2

(12) United States Patent
Hershenhorn

(10) Patent No.: US 8,965,759 B2
(45) Date of Patent: Feb. 24, 2015

(54) DIGITAL VOICE MEMO TRANSFER AND PROCESSING

(76) Inventor: Sarah Hershenhorn, Paris (FR)

(*) Notice: Subject to any disclaimer, the term of this patent is extended or adjusted under 35 U.S.C. 154(b) by 125 days.

(21) Appl. No.: 13/602,112

(22) Filed: Sep. 1, 2012

(65) Prior Publication Data

US 2014/0067362 A1 Mar. 6, 2014

(51) Int. Cl.
*G10L 15/26* (2006.01)

(52) U.S. Cl.
USPC .......................................................... 704/235

(58) Field of Classification Search
USPC .................................................. 704/235
See application file for complete search history.

(56) References Cited

U.S. PATENT DOCUMENTS

| | | | | |
|---|---|---|---|---|
| 5,875,448 | A * | 2/1999 | Boys et al. ................... | 715/201 |
| 6,748,211 | B1 * | 6/2004 | Isaac et al. ................. | 455/414.1 |
| 7,151,950 | B1 * | 12/2006 | Oyang et al. ............... | 455/556.1 |
| 7,200,556 | B2 * | 4/2007 | Aktas et al. .................... | 704/235 |
| 7,218,925 | B2 * | 5/2007 | Crocker et al. ............... | 455/419 |
| 7,263,483 | B2 * | 8/2007 | Pearah et al. ................. | 704/235 |
| 7,359,722 | B2 * | 4/2008 | Kim et al. ..................... | 455/466 |
| 7,636,548 | B2 * | 12/2009 | Kraft et al. ................... | 455/41.2 |
| 8,238,528 | B2 * | 8/2012 | Zafar .......................... | 379/88.23 |
| 8,447,285 | B1 * | 5/2013 | Bladon et al. .............. | 455/414.4 |
| 8,532,675 | B1 * | 9/2013 | Pasquero et al. ........... | 455/456.3 |
| 8,555,411 | B2 * | 10/2013 | Hurwitz ......................... | 726/34 |
| 8,616,975 | B1 * | 12/2013 | Saund et al. .................... | 463/40 |
| 8,837,528 | B2 * | 9/2014 | Harris et al. ................. | 370/497 |
| 2001/0041592 | A1 * | 11/2001 | Suonpera et al. .............. | 455/557 |
| 2002/0031208 | A1 * | 3/2002 | Hauschild et al. ......... | 379/88.22 |
| 2003/0050776 | A1 * | 3/2003 | Blair ............................ | 704/235 |
| 2003/0096594 | A1 * | 5/2003 | Naboulsi ....................... | 455/411 |
| 2004/0054539 | A1 * | 3/2004 | Simpson ..................... | 704/270.1 |
| 2004/0202291 | A1 * | 10/2004 | Skinner ........................ | 379/67.1 |
| 2006/0050669 | A1 * | 3/2006 | Kaikuranta et al. .......... | 370/338 |
| 2006/0080392 | A1 * | 4/2006 | Kawakami et al. ........... | 709/206 |
| 2006/0121923 | A1 * | 6/2006 | East ............................. | 455/518 |
| 2006/0172709 | A1 * | 8/2006 | Eyer et al. .................... | 455/90.3 |
| 2007/0124789 | A1 * | 5/2007 | Sachson et al. .............. | 725/117 |
| 2007/0141987 | A1 * | 6/2007 | Weinans et al. ............. | 455/41.2 |
| 2007/0150191 | A1 * | 6/2007 | Li et al. ........................ | 701/213 |
| 2007/0202808 | A1 * | 8/2007 | Kim ............................ | 455/41.2 |
| 2007/0244628 | A1 * | 10/2007 | Rockett et al. ............... | 701/117 |
| 2008/0077406 | A1 * | 3/2008 | Ganong ........................ | 704/251 |
| 2008/0153518 | A1 * | 6/2008 | Herberger et al. ........... | 455/466 |
| 2008/0167016 | A1 * | 7/2008 | Swanburg et al. ......... | 455/414.1 |
| 2008/0233977 | A1 * | 9/2008 | Xu et al. ....................... | 455/461 |
| 2008/0285731 | A1 * | 11/2008 | Mykhalchuk et al. ..... | 379/88.14 |
| 2009/0164877 | A1 * | 6/2009 | Chang et al. ................. | 715/203 |
| 2009/0164942 | A1 * | 6/2009 | Laaksonen et al. .......... | 715/810 |
| 2009/0185071 | A1 * | 7/2009 | Suzuki et al. ................. | 348/375 |

(Continued)

*Primary Examiner* — Jakieda Jackson
(74) *Attorney, Agent, or Firm* — LeonardPatel PC

(57) ABSTRACT

Systems, methods, apparatuses, and computer programs for transfer of recorded digital voice memos to a computing system and processing of the transferred digital voice memos by the computing system or another computing system are disclosed. A recording device is configured to record a voice memo from a user and store the voice memo. The recording device is also configured to transfer the recorded voice memo to a computing system. The computing system is configured to translate the transferred voice memo into a computer-readable format and parse the translated voice memo. The computing system is also configured to determine a type of software application to which the voice memo pertains via a preamble, a keyword, or a keyphrase in the translated voice memo. The computing system is further configured to create an item in the determined software application based on the translated voice memo.

21 Claims, 11 Drawing Sheets

(56) References Cited

U.S. PATENT DOCUMENTS

| | | | |
|---|---|---|---|
| 2009/0191925 A1* | 7/2009 | Moseler et al. | 455/573 |
| 2009/0271380 A1* | 10/2009 | Julia et al. | 707/3 |
| 2009/0299743 A1* | 12/2009 | Rogers | 704/235 |
| 2010/0010994 A1* | 1/2010 | Wittig et al. | 707/6 |
| 2010/0041447 A1* | 2/2010 | Graylin | 455/575.2 |
| 2010/0228404 A1* | 9/2010 | Link et al. | 701/1 |
| 2010/0273450 A1* | 10/2010 | Papineau et al. | 455/411 |
| 2010/0295960 A1* | 11/2010 | Furlan et al. | 348/222.1 |
| 2010/0299615 A1* | 11/2010 | Miluzzo et al. | 715/752 |
| 2010/0323664 A1* | 12/2010 | Sivaram et al. | 455/411 |
| 2011/0060669 A1* | 3/2011 | Laves | 705/34 |
| 2011/0131287 A1* | 6/2011 | Skakkebaek et al. | 709/206 |
| 2011/0141855 A1* | 6/2011 | Gault et al. | 368/10 |
| 2011/0144980 A1* | 6/2011 | Rysenga | 704/201 |
| 2011/0213845 A1* | 9/2011 | Logan et al. | 709/206 |
| 2011/0288866 A1* | 11/2011 | Rasmussen | 704/246 |
| 2011/0288914 A1* | 11/2011 | Guthrie | 705/14.4 |
| 2011/0294463 A1* | 12/2011 | Fiatal | 455/406 |
| 2012/0005376 A1* | 1/2012 | Meghdies Vardeh et al. | 710/8 |
| 2012/0021759 A1* | 1/2012 | Chen et al. | 455/456.1 |
| 2012/0101847 A1* | 4/2012 | Johnson et al. | 705/3 |
| 2012/0184255 A1* | 7/2012 | Macaluso | 455/414.3 |
| 2012/0197523 A1* | 8/2012 | Kirsch | 701/426 |
| 2012/0238216 A1* | 9/2012 | Hallowell et al. | 455/41.3 |
| 2012/0258664 A1* | 10/2012 | Kinneberg et al. | 455/41.2 |
| 2012/0283894 A1* | 11/2012 | Naboulsi | 701/1 |
| 2012/0297040 A1* | 11/2012 | Amano | 709/223 |
| 2013/0017790 A1* | 1/2013 | Oba et al. | 455/41.2 |
| 2013/0036167 A1* | 2/2013 | Bazot et al. | 709/204 |
| 2013/0090139 A1* | 4/2013 | McHenry et al. | 455/466 |
| 2013/0090924 A1* | 4/2013 | Rothschild | 704/235 |
| 2013/0157647 A1* | 6/2013 | Kolodziej | 455/419 |
| 2013/0226577 A1* | 8/2013 | Shmunis et al. | 704/235 |
| 2013/0273832 A1* | 10/2013 | Coleman | 455/3.02 |
| 2014/0024334 A1* | 1/2014 | Berry et al. | 455/404.2 |
| 2014/0032014 A1* | 1/2014 | DeBiasio et al. | 701/2 |
| 2014/0143053 A1* | 5/2014 | Mintz | 705/14.54 |
| 2014/0149930 A1* | 5/2014 | Chipchase | 715/800 |
| 2014/0235281 A1* | 8/2014 | Jang et al. | 455/457 |

* cited by examiner

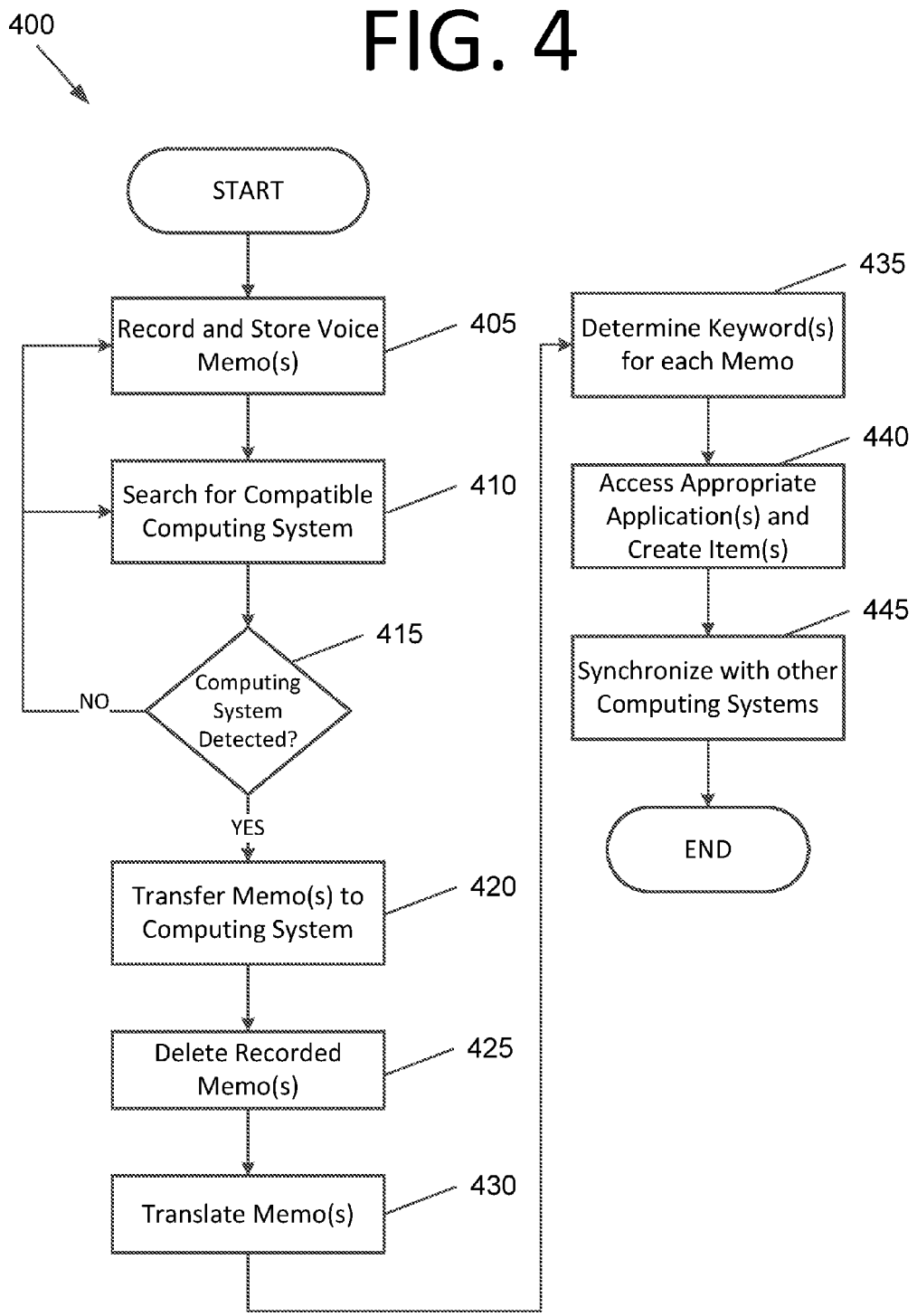

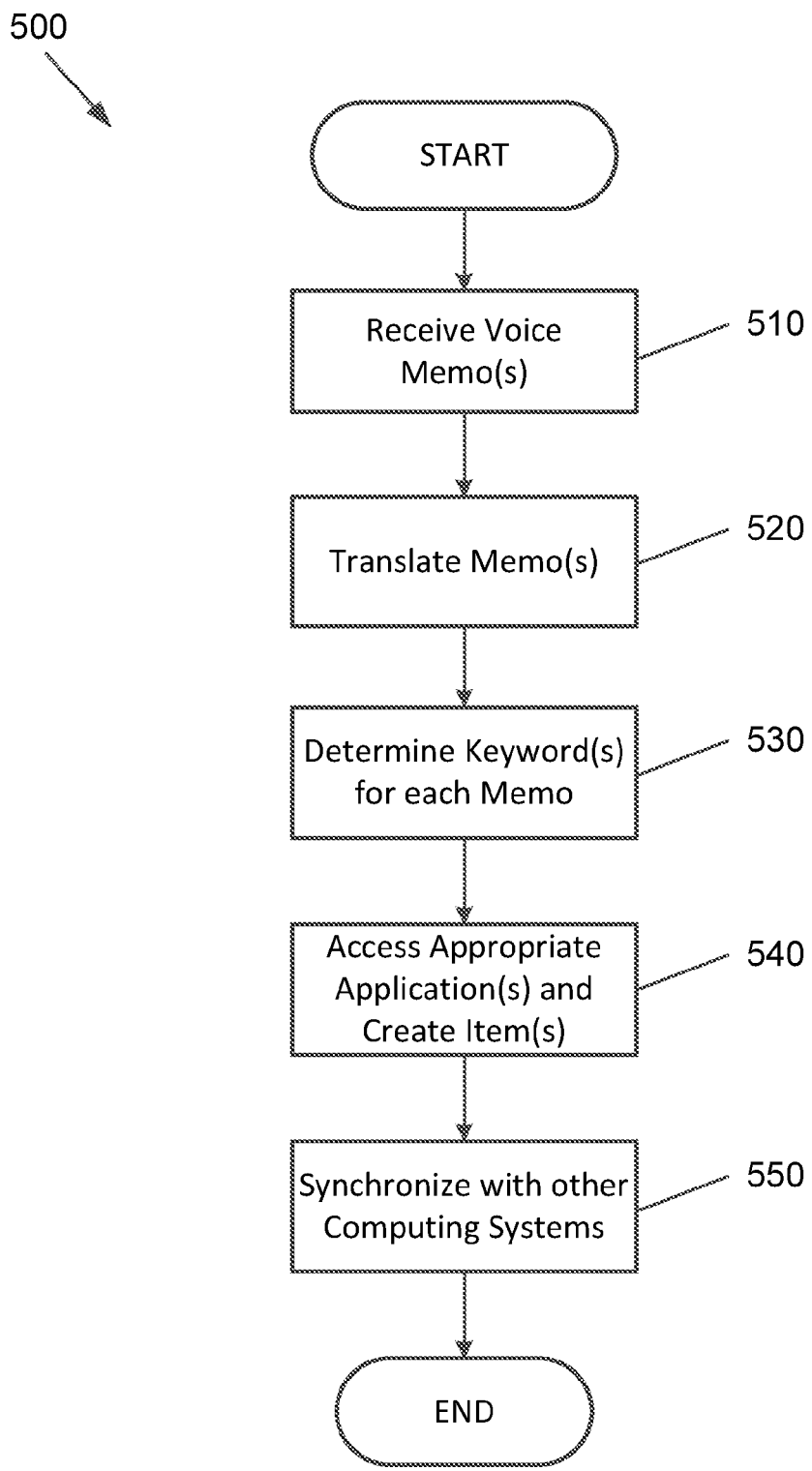

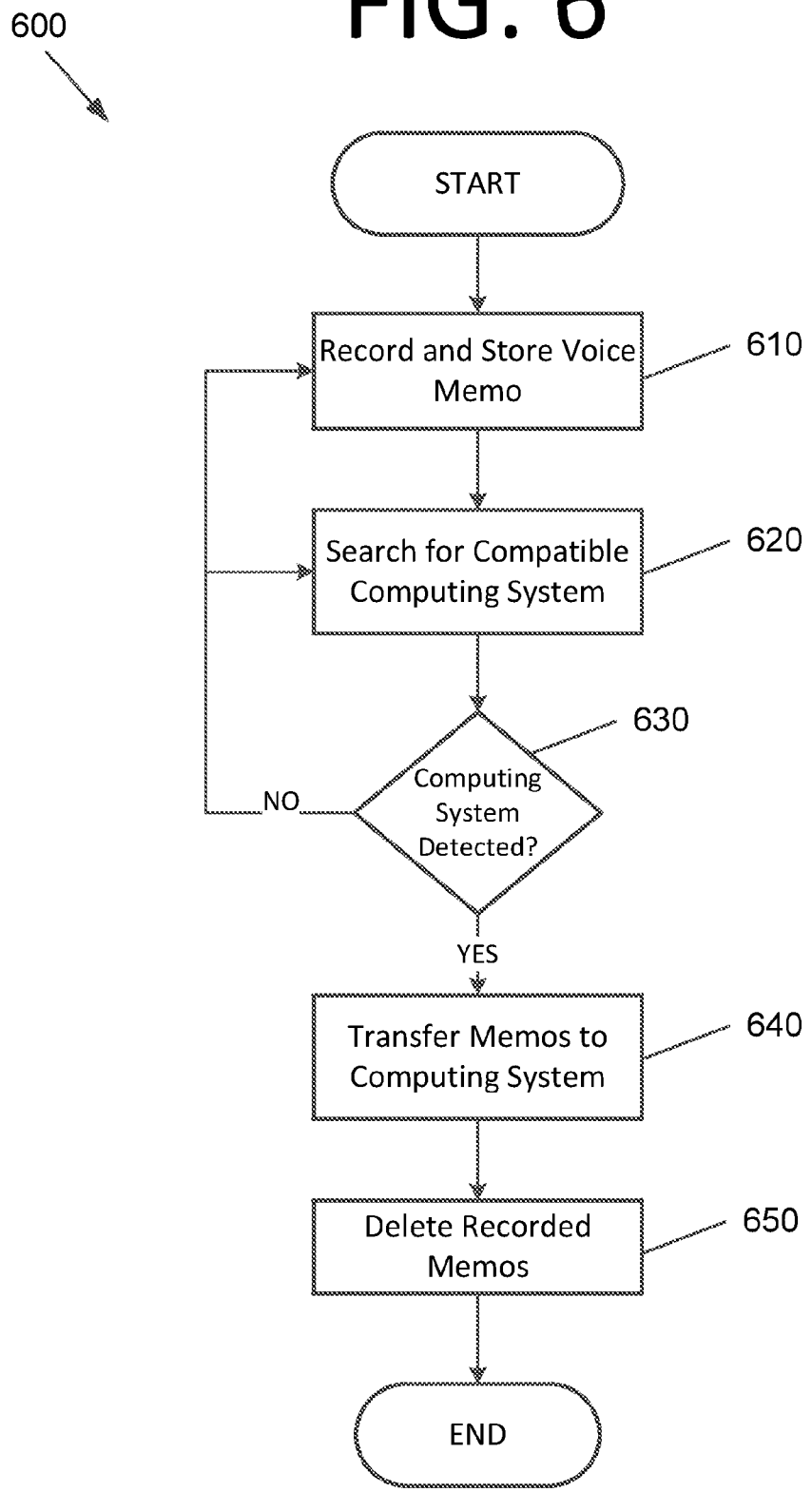

700 — "REMINDER" | "THINK OF SOME IDEAS FOR NATALIE'S BIRTHDAY PRESENT"

710 — "LIST" | "BULLET" | "APPLES" | "BULLET" | "BREAD" | "BULLET" | ...

"CALENDAR" | "DINNER WITH PARENTS AT SEVEN O'CLOCK PM TONIGHT"

"EMAIL MESSAGE" | "RECIPIENT" | "A@BC.COM" | "SUBJECT" | "STATUS REPORT" | "MESSAGE BODY" | ...

DIGITAL VOICE MEMO TRANSFER AND PROCESSING

FIELD

The present invention generally pertains to digital recording, and more specifically, to transfer of recorded digital voice memos to a computing system and processing of the transferred digital voice memos by the computing system or another computing system.

BACKGROUND

Mobile telephones have evolved to provide much of the functionality that was traditionally performed by larger computing systems, such as laptop and desktop computers. For example, many smart phones are able to execute software applications offering functionality that is also provided by larger computer systems. Such applications include web browsers, games, business applications, email applications, scheduling applications, and voice recording/memo applications. However, there are times when an individual may choose not to carry his or her mobile phone, such as when exercising or playing sports, when exposed to wet, humid, or otherwise inclement conditions, or when lacking pockets, for example. In such a case, when a user has an idea, wants to schedule an event, wants to dictate an email, or otherwise wants to record digital content, the user will not have the ability to do so. Furthermore, conventional systems lack the ability to interact with existing applications using voice memos. Accordingly, a system that addresses and overcomes these deficiencies may be beneficial.

SUMMARY

Certain embodiments of the present invention may be implemented and provide solutions to the problems and needs in the art that have not yet been fully solved by conventional approaches to digital voice memos (hereinafter "voice memos"). For example, some embodiments of the present invention enable a user to transfer voice memos from a recording device to a computing system, such as a mobile phone, a personal computer, a tablet computer, or any other suitable computing system. The computing system may determine the software application to which the memo pertains, translate the information contained in the voice memo, and create an appropriate item in the determined software application, such as a note, a calendar entry, an email, etc., based on the information contained in the voice memo.

In one embodiment of the present invention, a computer program embodied on a non-transitory computer-readable medium is configured to cause at least one processor to record a voice memo from a user via a microphone and store the voice memo in memory. The computer program is also configured to cause the at least one processor to search for a compatible computing system to transfer the recorded voice memo to, and when the computing system is detected, transfer the recorded voice memo to the computing system.

In another embodiment of the present invention, a computer-implemented method includes translating a voice memo, by a computing system, into a computer-readable format and parsing, by the computing system, the translated voice memo. The computer-implemented method also includes determining, by the computing system, a type of software application to which the voice memo pertains via a preamble, a keyword, or a keyphrase in the translated voice memo. The computer-implemented method further includes creating, by the computing system, an item in the determined software application based on the translated voice memo.

In yet another embodiment of the present invention, a system includes a computing system and a recording device. The recording device is configured to record a voice memo from a user and store the voice memo. The recording device is also configured to transfer the recorded voice memo to the computing system. The computing system is configured to translate the transferred voice memo into a computer-readable format and parse the translated voice memo. The computing system is also configured to determine a type of software application to which the voice memo pertains via a preamble, a keyword, or a keyphrase in the translated voice memo. The computing system is further configured to create an item in the determined software application based on the translated voice memo.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 4 is a flowchart illustrating a method for recording, transferring, and processing voice memos, according to an embodiment of the present invention.

FIG. 5 is a flowchart illustrating a method for processing voice memos, according to an embodiment of the present invention.

FIG. 6 is a flowchart illustrating a method for recording and transferring voice memos, according to an embodiment of the present invention.

DETAILED DESCRIPTION OF THE EMBODIMENTS

Figure 1:
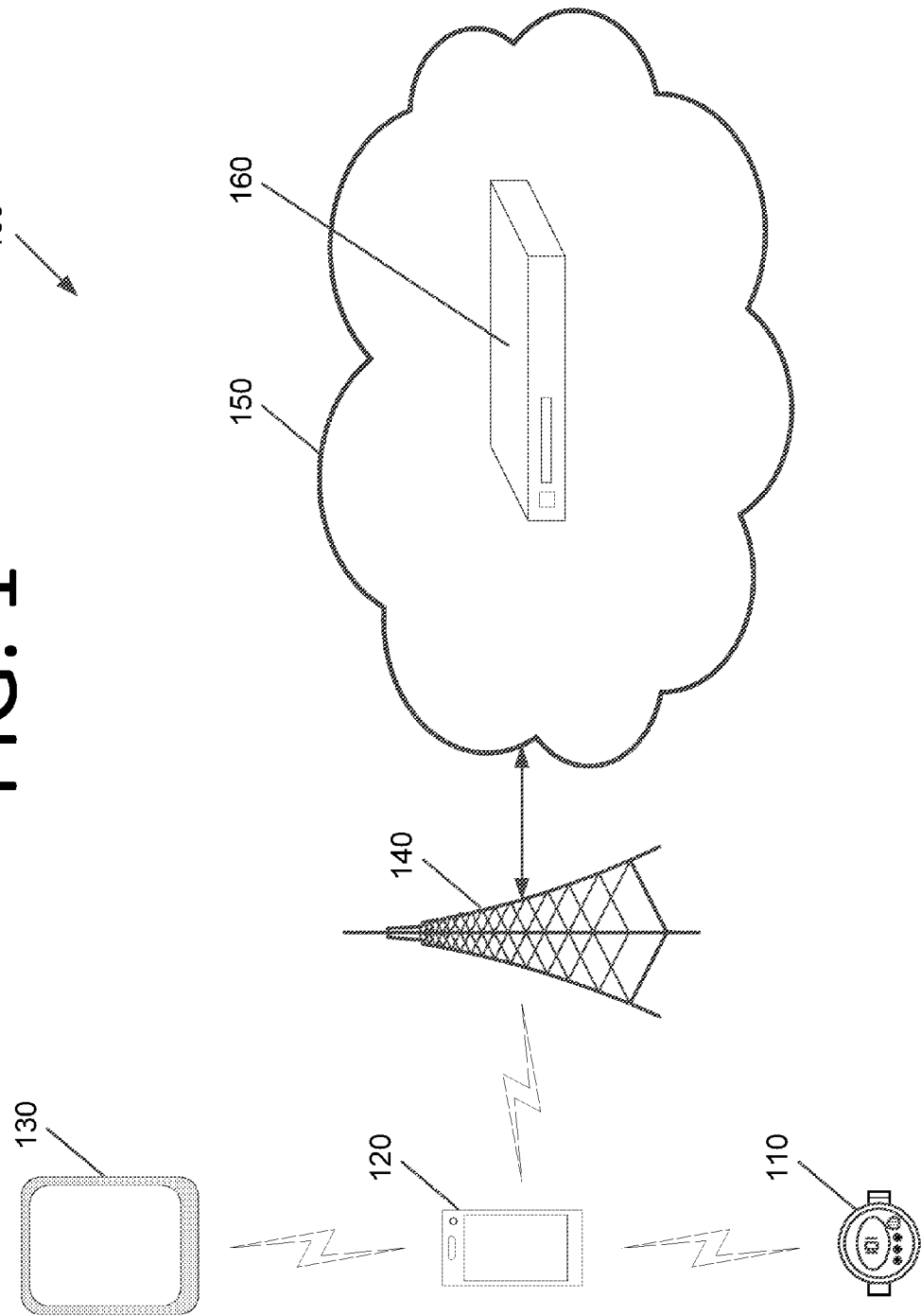
FIG. 1 illustrates an architectural diagram of a system, according to an embodiment of the present invention.

Some embodiments of the present invention enable a user to transfer one or more recorded voice memos from a digital recording device to a computing system, and to create an item in a corresponding software application of the computing system based on the content of the voice memo. For example, each respective voice memo may refer to an idea, a grocery list, or any other content for a memo application, an event to schedule for a calendaring application, a dictated email to be sent by an email application, or any other recorded digital content that the user wishes to apply to a software application on a computing device at a later time, including, but not limited to, Facebook® (e.g., status updates, photos, etc.), Twitter®, etc. Applications may have any use and the recording device may be tailored to any desired application, such as personal applications, business applications, and military applications, for example. In some embodiments, when the recording device has the capability, recorded video data and/or photos or other digital images may also be transferred to the computing system for use with a suitable application.

An advantage of the recording device is that it may be architecturally simpler, smaller, cheaper, and more portable than many other more complex computing systems, such as mobile phones and personal computers. Further, the user can use the recording device in situations where electronics may be more prone to being damaged or lost. The recording device may also be significantly smaller, lighter, and more easily configured to be secured to a user's body and/or clothing than a mobile telephone in some embodiments. For example, the recording device may be secured via a strap, a band, a clip, an adhesive, or any other suitable attachment mechanism.

The recording device may have wireless and/or wired communication abilities, such that the recording device can communicate with an external computing system, such as a cell phone, a laptop computer, or a desktop computer, for example. Where the recording device is configured for wireless communication (e.g., using a protocol such as Bluetooth™), the recording device may be configured to transfer recorded voice memos, and possible video data if so configured, to the computing system via the protocol when within a certain proximity to the computing system and/or when the computing system is detected.

Upon receipt of the voice memo, a voice memo processing application running on the computing system may translate the voice memo into text and decipher a preamble and/or a keyword or keyphrase within the text to determine a software application to which the voice memo applies. The preamble may be the first word or multiple words spoken in the voice memo, for example. A keyword may be a single word and a keyphrase may be multiple words (e.g., a phrase). The voice memo processing application may also decipher other keywords and/or keyphrases contained in the voice memo that are specific to the type of item that the voice memo is intended to create. The voice memo processing application may then interface with the appropriate software application indicated in the text and create the appropriate item and/or initiate the appropriate functionality of the appropriate software application. The voice memo processing application or another application may further synchronize the appropriate item with another computing system.

In some embodiments, a conventional computing system, such as a mobile phone or personal computer, is used to record voice content instead of the recording device discussed above. The computing system may also record video content in some embodiments. In such embodiments, the computing system operates in a similar manner to the computing system discussed above, but does not need to receive voice memos/video from an external recording device. Furthermore, in such a case, the computing system may have access to a telecommunications network (e.g., a mobile phone or a personal computer with a card facilitating access to a telecommunications system) and may synchronize appropriate items with other computing systems via any suitable communications network. Additionally, in these and other embodiments, items and/or application synchronization information may be stored using a cloud storage system or any other suitable storage system.

FIG. 1 illustrates an architectural diagram of a system 100, according to an embodiment of the present invention. System 100 includes a recording device 110, a mobile phone 120, a tablet computer 130, a base station 140, a telecommunications network 150, and a server 160. While the communications here are shown as wireless, in some embodiments, wired communications may also be used for one or more of the communication links. A user may record one or more voice memos using recording device 110. In some embodiments, users may also record video data. When the user is outside of communication with, and/or more than a certain distance from, mobile phone 120, the recorded voice memos/video data may remain on recording device 110 unless the user chooses to delete one or more voice memos/video data, for example.

Upon coming within a certain proximity of and/or communication with mobile phone 120, one or both of recording device 110 and mobile phone 120 detects the other device and initiates a transfer of the voice memos (and video data if so configured) from recording device 110 to mobile phone 120. In some embodiments, the voice memos may be deleted from recording device 110 after transfer to mobile phone 120 in order to conserve memory.

Mobile phone 120 may then translate the voice memo(s) itself or send the voice memos to another computing system for translation. Effective voice recognition software can be complex and processing-intensive, often including millions of lines of code in its uncompiled form. Accordingly, translation by a computing system with significant processing capabilities, such as an enterprise server, may be preferable in some embodiments. With such an architecture, translation can be offered as a subscription service.

In FIG. 1, mobile phone 120 communicates with a telecommunications network 150 via base station 140. Telecommunications network 150 may be any telecommunications network, such as those of any currently available commercial carrier or combination of carriers, may utilize any suitable standards and technologies, such as enhanced Node Bs, Radio Network Controllers ("RNCs"), 3G, 4G, 5G (when defined and released), etc. Mobile phone 120 wirelessly communicates with a base station 140 that transmits data to, and receives data from, mobile phone 120. Base station 140, in turn, communicates with telecommunications network 150. For the sake of convenience, the details of telecommunications network 150 are abstracted here, but may have any desired architecture, as would be understood by one of ordinary skill in the art.

Within, or otherwise accessible by, telecommunications network 150 is a server 160 that translates voice memos for mobile phone 120. Upon receiving one or more voice memos from mobile phone 120, server 160 translates the voice memo(s) into a format that can be used by mobile phone 120 (e.g., ASCII text, Unicode, entries in a relational database, etc.). Server 160 then sends the translated voice memo(s) back to mobile phone 120 via telecommunications network 150 and base station 140.

A voice memo processing application on mobile phone 120 then deciphers a preamble and/or one or more keywords/keyphrases within the translated voice memo(s) to determine one or more software applications to which the voice memo(s) apply and to determine which components of the items to be created that different parts of the voice memo pertain to. The voice memo processing application may then create the appropriate item and/or initiate the appropriate functionality of the appropriate software application(s). In some cases, a single voice memo may apply to multiple software applications, and multiple respective items may be created. For instance, a calendar entry item may be applied to multiple calendar applications. If video data is used by the software application, recorded video data may also be provided to the appropriate application and/or incorporated into the item. In some embodiments, mobile phone 120 may further synchronize the appropriate item with one or more other computing systems, such as tablet computer 130. Alternatively, the one or more other computing systems may synchronize in a similar fashion to that shown in, and described with respect to, FIG. 8.

Figure 2:
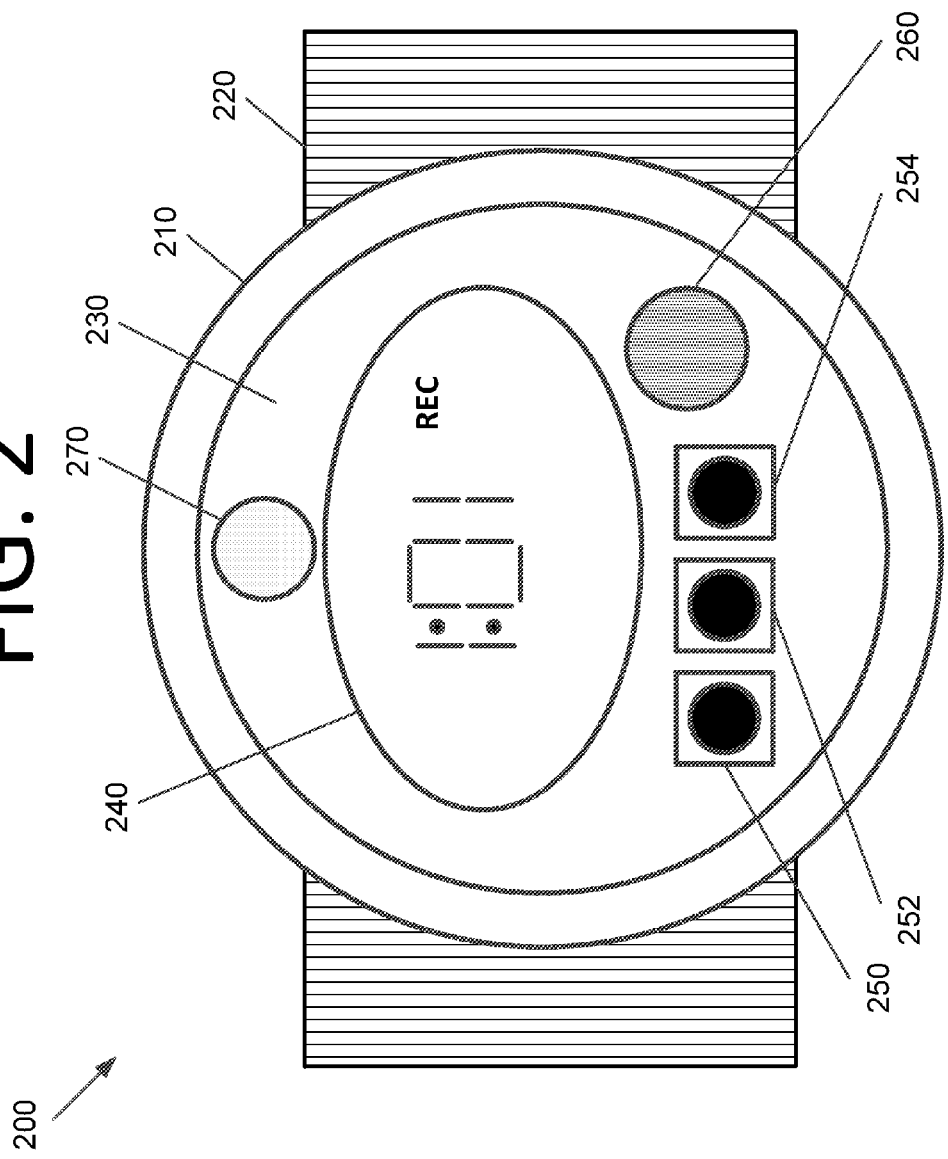
FIG. 2 illustrates a top view of a recording device, according to an embodiment of the present invention.

FIG. 2 illustrates a top view of a recording device 200, according to an embodiment of the present invention. In some embodiments, recording device 200 may be recording device 110 in system 100 of FIG. 1, for example. Recording device 200 includes a body 210 and a strap 220 operably connected to body 210. While strap 220 is shown in FIG. 2, an elastic band, clip, or any other suitable fastening or securing mechanism may be used. Recording device 200 may be configured to be secured around a user's wrist, clip to clothing, attach to a belt, or have any other suitable configuration. Further, in some embodiments, recording device 200 may be incorporated into another product, such as a bracelet, a watch, an MP3 player, sewn into clothing, or be incorporated into any other article or electronic device, and may have any desired shape, size, and/or color.

Body 210 includes a face 230. Face 230 includes a display 240, a microphone 260, and a video camera 270. While a single video camera is shown in FIG. 2, in some embodiments, multiple video cameras may be used to capture three dimensional ("3D") video, for example. In some embodiments, a display may not be included in order to reduce cost and complexity. A start/stop button 250, a select recording button 252, and a delete button 254 are also located on face 230. In certain embodiments, an extra button (not shown) may be included to start/stop recording of video data.

A wireless communication device (not shown), such as a transceiver, may be included within or otherwise attached to recording device 200. In certain embodiments, recording device 200 may be capable of communicating with a telecommunications network. In such embodiments, recorded voice memos may be transferred to a central server for processing, and then synchronized with appropriate computing systems.

A power supply (not shown), such as a battery or outlet power, provides power for recording device 200. In some embodiments, the battery may be a lithium ion battery, an alkaline battery, or any other suitable rechargeable or non-rechargeable battery type.

Digital display 240 shows the current amount of time that a memo has been recorded so far, and indicates that recording device 200 is in a recording state. Other indicia may also be shown, such as the total number of voice memos, the current voice memo number, the current time, the amount of recording time remaining in memory, and/or any other suitable indicia as would be appreciated by one of ordinary skill in the art. Sound is picked up via microphone 260. A non-transitory computer-readable medium, i.e. memory (not shown), may provide a desired amount of recording time, such as ten minutes, depending on the storage capacity. Any suitable memory size and type may be used, and recording device 200 may be configured such that memory can be inserted into and removed from recording device 200 to replace faulty memory and/or to upgrade the storage capacity.

Start/stop button 250 starts and stops the recording functionality of recording device 250. Select recording button 252 scrolls between voice memos. If a user selects the start/stop recording button while on a selected voice memo, the additional recorded digital audio may be appended to the selected voice memo. Further, video data may be appended to, or otherwise associated with (e.g., an identifier), a selected voice memo and/or a new voice memo. Delete button 254 deletes the selected voice memo, and if appropriate, associated video data.

While buttons are shown here, any suitable control mechanism may be used. For instance, in lieu of buttons, recording device 200 may have a haptic (e.g., touch screen) interface that detects physical user input. For example, display 230 may function as such a haptic interface in some embodiments, having sensors underneath that detect pressure from a touch of a finger, stylus, or other suitable object. This allows "button" functionality of recording device 200 to be configured dynamically via software updates, for example. Also, in some embodiments, transfer of recorded voice memos from recording device 200 to a computing system may be manual, initiated by an appropriate button, or via any other suitable mechanism.

In some embodiments, security functionality may also be included. For instance, physical buttons (e.g., an alphanumeric keypad) may be present that enable a user to enter a password in order to access recording device 200. In haptic interface (e.g., touch screen) embodiments, display 230 may contain functionality for entry of a password. In certain embodiments, other security technology may be used, such as a fingerprint scanner, a device for reading the pattern of a user's retina, or any other security technology.

In certain embodiments, recording device 200 may have sufficient computing power to run certain software applications that sophisticated computing systems such as mobile phones and personal computers can run, or to provide certain functionality for such applications. For example, recording device 200 may be able to periodically synchronize with another computing device, or may synchronize with the other computing device when proximate thereto. For instance, recording device 200 may be able to track the time that events occur from a calendaring application and to sound an alarm, vibrate, and/or show text when an event occurs.

Figure 3:
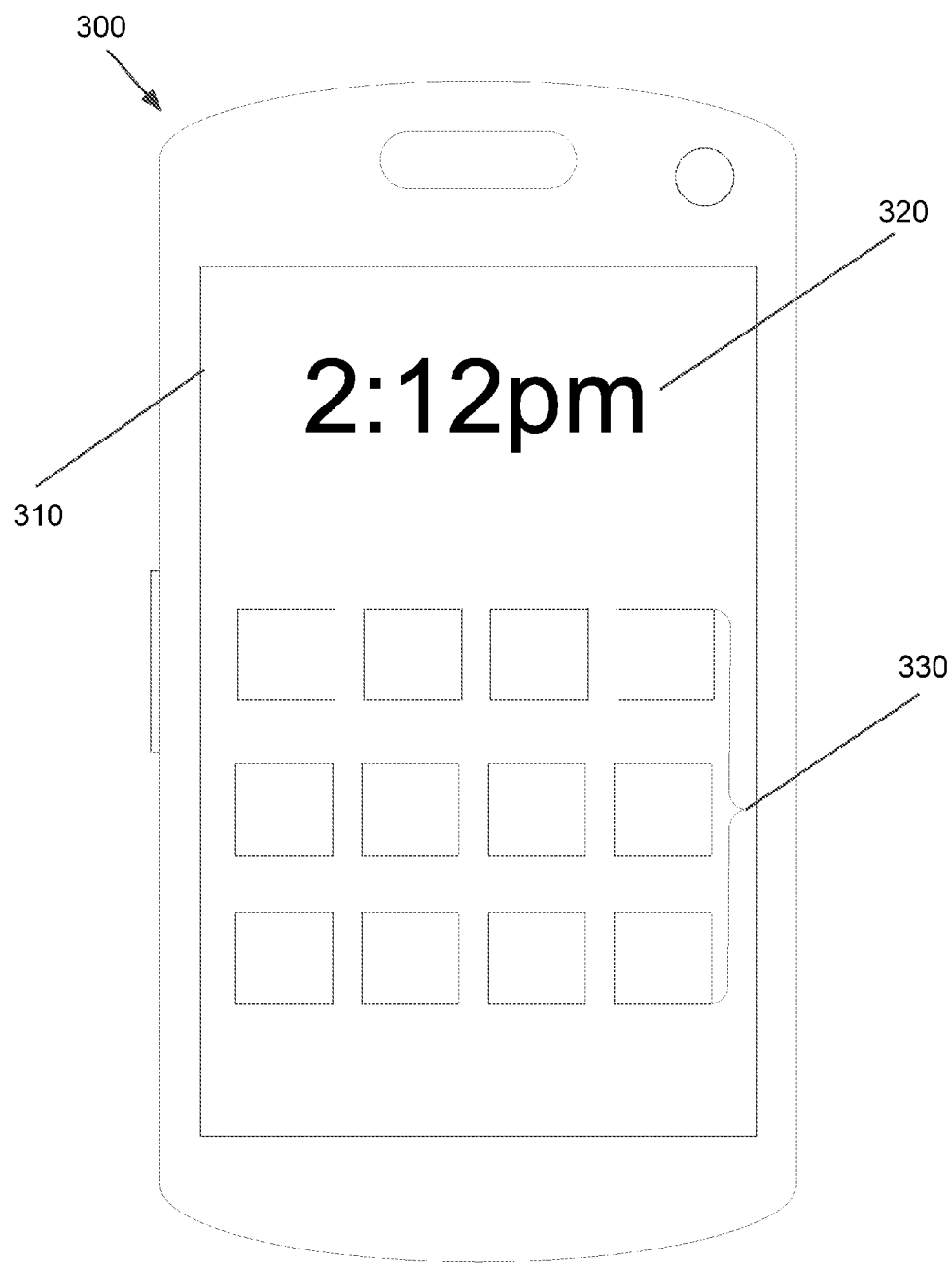
FIG. 3 illustrates a front view of a mobile phone, according to an embodiment of the present invention.

FIG. 3 illustrates a front view of a mobile phone 300, according to an embodiment of the present invention. In some embodiments, mobile phone 300 may be mobile phone 120 in system 100 of FIG. 1 or mobile phone 810 of FIG. 8, for example. Mobile phone 300 includes a large screen 310 as is common with many conventional smart phones. Screen 310 displays the current time 320, as well as buttons 330 for twelve software applications. The applications may include, but are not limited to, web browsing applications, email applications, calendaring applications, business applications, games, notepad applications, etc. One or more of the software applications may be accessed by a voice memo processing application running on mobile phone 300. The voice memo processing application may be accessible by the user, inaccessible to the user and running in the background, integrated as part of the operating system, triggered when another software application is opened, integrated into one or more other software applications, etc. The voice memo processing application may also be configured to process video data in some embodiments.

The voice memo processing application may be compatible with, or specifically configured for, the iPhone®, iPad®, iPod Touch®, Android® smart phones, or for any other suitable electronic device. Further, in some Apple-based embodiments, the synchronization functionality may be enabled when more than one computing system is linked to an iTunes® account. The recording device may have multiple accounts such that the recording device may have accounts for different family members, employees in a business, and/or any other association or group of individuals. This synchronization functionality may be included with the voice memo processing application or facilitated by third party tools in other embodiments.

In certain embodiments, mobile phone 300 may periodically retrieve (i.e., synchronize) information for various applications from one or more other computing devices. For example, synchronization may occur once every 5 minutes, once per hour, once per day, or any other desired time period. Such synchronization may be particularly useful for certain applications such as calendaring applications, for example.

FIG. 4 is a flowchart 400 illustrating a method for recording, transferring, and processing voice memos, according to an embodiment of the present invention. In some embodiments, the method of FIG. 4 may be implemented by system 100 of FIG. 1, for example. The method begins with recording and storing a voice memo from a user by a recording device at 405. The recording device may also track the time and date that each voice memo was recorded, as well as the current time.

In the voice memo, the user speaks a keyword to indicate the type of the voice memo. For instance, the keyword "MEMO" may indicate that the voice memo is intended for a notepad application and the keyword "EMAIL" may indicate that the voice memo is intended for an email application. Additional, application-specific keywords may also be included in the voice memo. For example, in the case of an email voice memo, the user may use keywords such as "RECIPIENT", "SUBJECT", "MESSAGE BODY", etc. to designate various parts of the email message. Keywords may also be uncommon or made up such that accidentally speaking the keyword is unlikely. Further, a special word or phrase spoken before a keyword may indicate that the keyword is part of the general voice memo content, and not a command.

Once recorded and stored, the recording device searches for a compatible computing system at 410. The compatible computing system may be a single designated computing system, multiple designated computing systems, or any computing system that is running the voice memo processing application and registered to the user. The recording device may check at 415 whether it is in range of a computing system periodically (e.g., every 30 seconds, or with any desired frequency), and may only search for a nearby computing system when one or more voice memos are recorded in some embodiments. In some embodiments, instead of actively checking for nearby computing systems, the user may manually select a button or other input mechanism of the recording device to indicate that the recording device should attempt to transfer stored voice memos to any nearby compatible computing device. Such embodiments may help to preserve battery power.

If no computing system is detected at 415, the recording device may wait until the next periodic check and/or record another voice memo for the user. If a computing system is detected at 415, however, the recording device transfers the recorded voice memos to the computing system at 420 using a suitable protocol such as Bluetooth™. Per the above, embodiments of the recording device may be capable of wired transfer, wireless transfer, or both. The recording device may initiate the transfer to the computing system, the computing system may initiate the transfer by the recording device, or both devices may be capable of initiating the transfer.

After transferring the voice memos at 420, the recording device may automatically delete the stored voice memos at 425 to conserve memory. In some embodiments, the recording device may only delete voice memos that are more than a predetermined amount of time older than the present time (e.g., 1 hour ago or older). In certain embodiments, the user may delete the voice memos manually. This may be in addition to, or in lieu of, the automatic deletion mechanisms.

The voice memos are then translated at 430 from an audio file to another format usable by the voice memo processing application, such as a text file or entries in a relational database (e.g., SQL). If present, video data may also be identified and stored. This translation may be performed by the computing system itself, or sent by the computing system to another computing system that is better equipped to handle translations, such as server 160 of FIG. 1, for example. In such a case, the computing system will receive the translated voice data in the usable format back from the translating computing system, likely by way of intermediary computing systems/networks.

The voice memo processing application then searches for one or more keywords within each voice memo at 435. The keywords may designate the type of the voice memo, the application that should be used, various related fields (such as email fields, next line, next paragraph, etc.), or any other suitable designations. The voice memo processing application may also be capable of recognizing other information, such as times, dates, etc. The voice memo processing application then accesses the appropriate application for each voice memo and creates, or facilitates creation of, the appropriate item therein at 440, such as an email, a note, a calendar entry, a letter, etc. In some embodiments, the voice memo processing application may exist as a plugin or module within another software application, and determination of the specific application to which the voice memo belongs may not be necessary.

The voice memo processing application then synchronizes the created items at 445 with other corresponding software applications on one or more other computing systems. This may be performed by a voice memo processing application on the other computing systems, via third party software such as iTunes®, or by any other suitable mechanism. Synchronization may not be performed in some embodiments.

FIG. 5 is a flowchart 500 illustrating a method for processing voice memos, according to an embodiment of the present invention. In some embodiments, the method of FIG. 5 may be implemented by mobile phone 120 of FIG. 1, mobile phone 300 of FIG. 3, or mobile phone 810 of FIG. 8, for example. The method begins with receiving one or more voice memos at 510. The voice memos are then translated at 520 from an audio file to another format usable by the voice memo processing application. This translation may be performed by the computing system itself, or sent by the computing system to another computing system that is better equipped to handle translations.

The voice memo processing application then searches for one or more keywords within each voice memo at 530. The voice memo processing application next accesses the appropriate application for each voice memo and creates, or facilitates creation of, the appropriate item therein at 540. The voice memo processing application synchronizes the created items at 550 with other corresponding software applications on one or more other computing systems.

FIG. 6 is a flowchart 600 illustrating a method for recording and transferring voice memos, according to an embodiment of the present invention. In some embodiments, the method of FIG. 6 may be implemented by recording device 110 of FIG. 1 or recording device 200 of FIG. 2, for example. The method begins with recording and storing a voice memo from a user by a recording device at 610. In some embodiments, video data may also be recorded and stored. Once recorded and stored, the recording device searches for a compatible computing system at 620. The recording device then checks at 630 whether it is in range of a computing system periodically, and may only search for a nearby computing system when one or more voice memos are recorded in some embodiments.

If no computing system is detected at 630, the recording device may wait until the next periodic check and/or record another voice memo for the user. If a computing system is detected at 630, however, the recording device transfers the recorded voice memos, and video data if so configured, to the computing system at 640 using a suitable protocol such as Bluetooth™. After transferring the voice memos at 640, the recording device may automatically delete the stored voice memos/video data at 650 to conserve memory.

Voice Memo Example for Notepad Application

Figure 7A:
FIG. 7A illustrates translated voice memo text for a reminder application, according to an embodiment of the present invention.
Figure 7B:
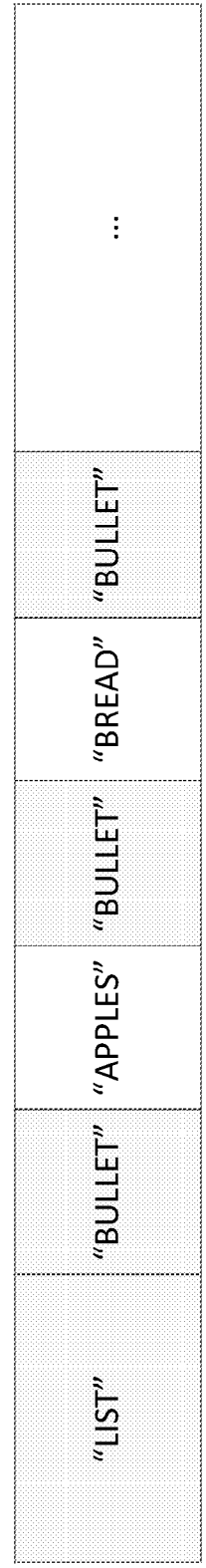
FIG. 7B illustrates translated voice memo text for a notepad application, according to an embodiment of the present invention.

FIGS. 7A and 7B illustrate translated voice memo text 700, 710 for a reminder application and a notepad application, according to an embodiment of the present invention. In voice memo 700, a preamble of "REMINDER" indicates to the voice memo processing application that a reminder entry is to be created in a reminder application with the content following the preamble. In voice memo 710, keywords/keyphrases are used. The voice memo processing application will recognize various keywords based on the memo type. For instance, in this case, the keyword "LIST" indicates to the application that a list of items will follow, and an appropriate notepad application will be used. The keyword "BULLET" indicates a new bullet of text—in this case, for a grocery list. The text following each bullet is associated with that bullet, until the next instance of "BULLET" or the voice memo ends. It should be noted that in the context of a relational database, the translation application, whether part of or external to the voice memo processing application, may populate appropriate fields in the relational database for keywords/keyphrases and content based on the text of the voice memo.

Voice Memo Example for Calendar Application

Figure 7C:
FIG. 7C illustrates translated voice memo text for a calendar application, according to an embodiment of the present invention.

FIG. 7C illustrates translated voice memo text 720 for a calendar application, according to an embodiment of the present invention. Preamble 720 indicates to the voice memo processing application that the voice memo is for a calendar application. The remainder of the text is then parsed by the voice memo processing application to find date/time information. For instance, "SEVEN O'CLOCK PM" and "TONIGHT" are keywords/keyphrases that provide the voice memo processing application with the information it needs to create the appropriate item in the calendar application (i.e., a calendar entry). In some embodiments, calendar entries may be entered into multiple calendar applications, such as Outlook®, iCloud®, etc.

Voice Memo Example for Email Application

Figure 7D:
FIG. 7D illustrates translated voice memo text for an email application, according to an embodiment of the present invention.

FIG. 7D illustrates translated voice memo text 730 for an email application, according to an embodiment of the present invention. The keyphrase "EMAIL MESSAGE" indicates that the voice memo is a dictated email. The keyword "RECIPIENT" indicates the email address to send the email to, "SUBJECT" indicates the title, and "MESSAGE BODY" denotes the body of the email message. Any other email functionality, such as "INSERT SIGNATURE", "CC", "BCC", etc., could also be implemented. In order to provide the user with the ability to review a dictated email before sending, the email may be stored as a draft in the email application instead of automatically sending the email upon receipt thereof by the email application.

Address Book

Figure 7E:
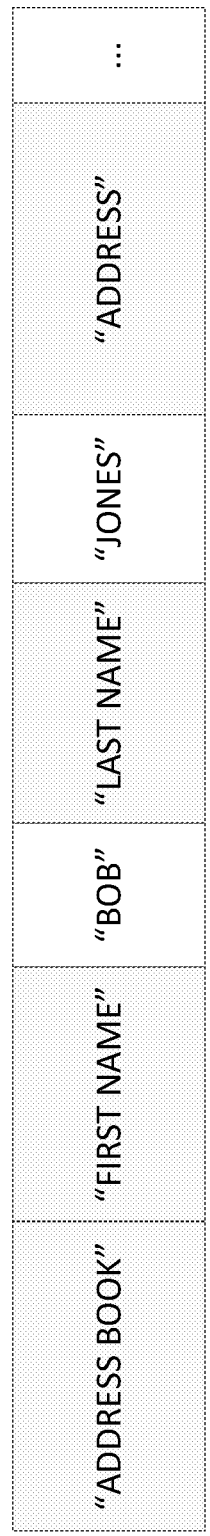
FIG. 7E illustrates translated voice memo text for an address book application, according to an embodiment of the present invention.

FIG. 7E illustrates translated voice memo text 740 for an address book application, according to an embodiment of the present invention. The keyphrase "ADDRESS BOOK" indicates that the voice memo is an address book contact. The keyphrase "FIRST NAME" indicates the contact's first name, "LAST NAME" indicates the contact's last name, and "ADDRESS" indicates the contact's address. Other keyphrases may also designate any other information common with a calendaring application, such as email addresses, phone numbers, fax numbers, websites, etc. The address book application may be configured to search whether the address book contact already exists. If so, the address book application may modify the contact information with the memo information. If not, the address book application may create a new contact.

In some embodiments, instead of, or in addition to, using keywords/keyphrases, pauses of a predetermined length or more (e.g., 3 seconds, 5 seconds, or any other period) in the voice memo may be detected and interpreted. For instance, a pause may indicate that a new bullet should be added for text following the pause for a list of items. In certain embodiments, pauses of different lengths may indicate different types of information.

Figure 8:
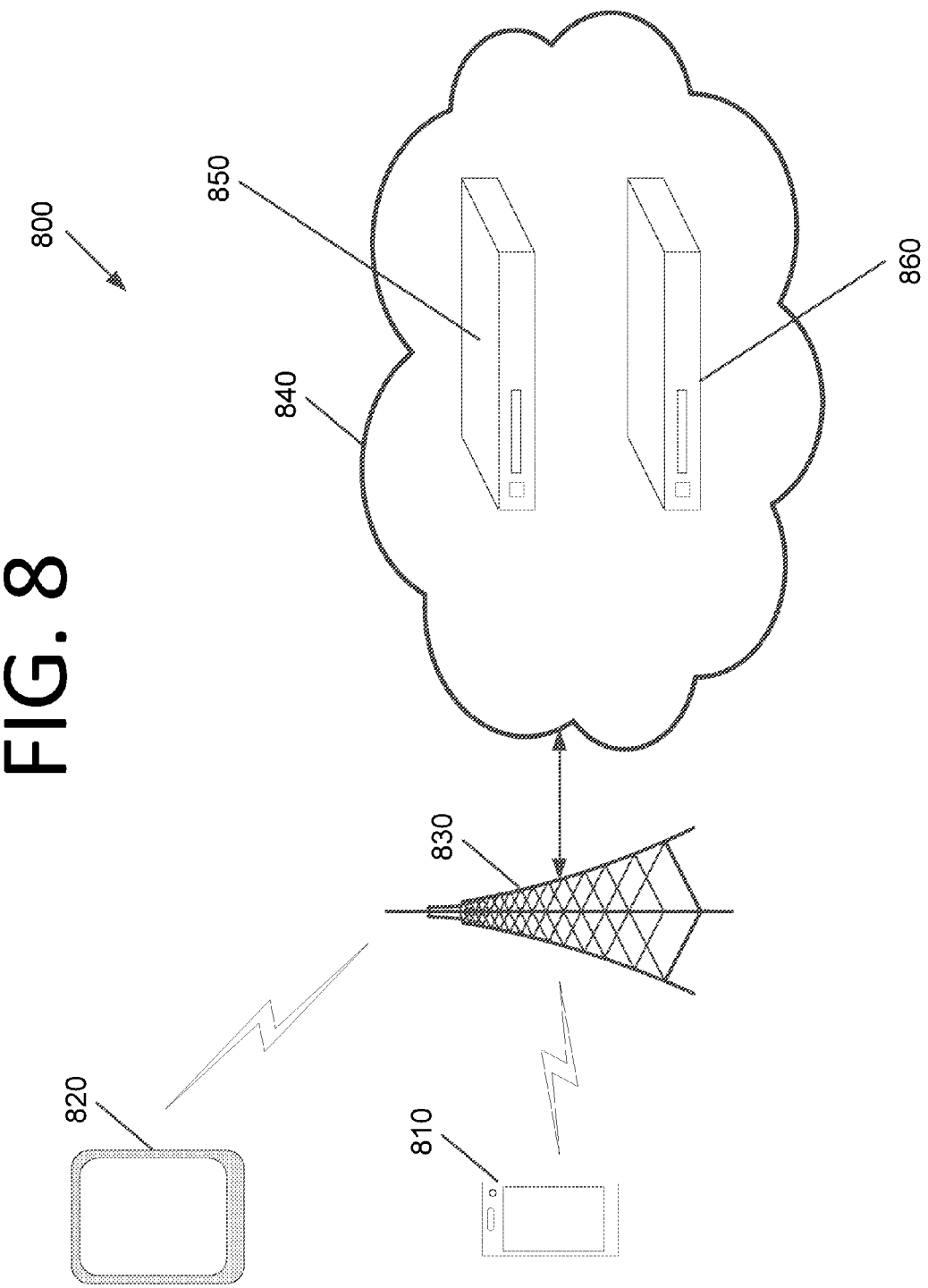
FIG. 8 illustrates an architectural diagram of a system, according to an embodiment of the present invention.

FIG. 8 illustrates an architectural diagram of a system 800, according to an embodiment of the present invention. System 800 includes a mobile phone 810, a tablet computer 820, a base station 830, a telecommunications network 840, a translation server 850, and a synchronization server 860. In some embodiments, the functions of translation server 850 and synchronization server 860 may be offered by a single server and/or implemented as part of a cloud computing architecture. While the communications here are shown as wireless, in some embodiments, wired communications may also be used for one or more of the communication links. A user may record one or more voice memos using mobile phone 810. In some embodiments, users may also record video data.

Mobile phone 810 may translate the voice memo(s) itself or send the voice memos to another computing system for translation. In FIG. 8, mobile phone 810 communicates with a telecommunications network 840 via base station 830. Mobile phone 810 wirelessly communicates with a base station 830 that transmits data to, and receives data from, mobile phone 810. Base station 830, in turn, communicates with telecommunications network 840.

Within, or otherwise accessible by, telecommunications network 840 is a translation server 850 that translates voice memos for mobile phone 810. Upon receiving one or more voice memos from mobile phone 810, server 850 translates the voice memo(s) into a format that can be used by mobile phone 810. Translation server 850 then sends the translated voice memo(s) back to mobile phone 810 via telecommunications network 840 and base station 830.

A voice memo processing application on mobile phone 810 then deciphers a preamble and/or one or more keywords/keyphrases within the translated voice memo(s) to determine one or more software applications to which the voice memo(s) apply and to determine which components of the items to be created that different parts of the voice memo pertain to. The voice memo processing application may then create the appropriate item and/or initiate the appropriate functionality of the appropriate software application(s). In some cases, a single voice memo may apply to multiple software applications, and multiple respective items may be created. For instance, a calendar entry item may be applied to multiple calendar applications. If video data is used by the software application, recorded video data may also be provided to the appropriate application and/or incorporated into the item.

In some embodiments, mobile phone 810 may further synchronize the appropriate item with one or more other computing systems, such as tablet computer 820, via synchronization server 860. Synchronization server 860 stores created items from mobile phone 810, or data sufficient to create similar items on applications running on other computing systems. When synchronizing, mobile phone 810 may send the items or other synchronization data to synchronization server 810, which then pushes appropriate data out to other computing systems, such as tablet computer 820, in order to create corresponding items on respective applications of the other computing systems.

Figure 9:
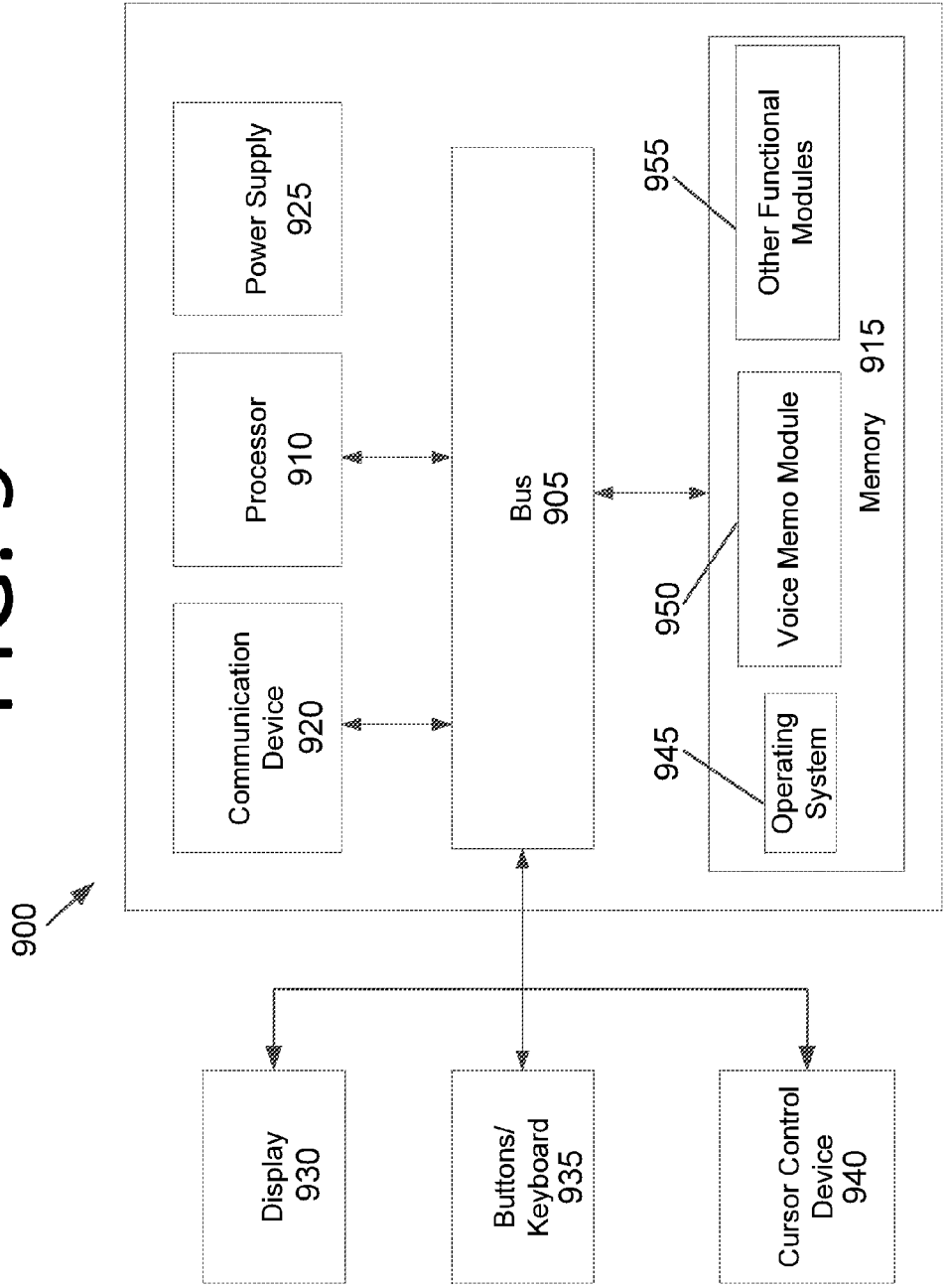
FIG. 9 illustrates a computing system, according to an embodiment of the present invention.

FIG. 9 illustrates a computing system 900, according to an embodiment of the present invention. System 900 includes a bus 905 or other communication mechanism for communicating information, and a processor 910 coupled to bus 905 for processing information. Processor 910 may be any type of general or specific purpose processor, including a central processing unit ("CPU") or application specific integrated circuit ("ASIC"). System 900 further includes a memory 915 for storing information and instructions to be executed by processor 910. Memory 915 can be comprised of any combination of random access memory ("RAM"), read only memory ("ROM"), flash memory, cache, static storage such as a magnetic or optical disk, or any other types of non-transitory computer-readable media or combinations thereof. Additionally, system 900 includes a communication device 920, such as a transceiver, to wirelessly provide access to a telecommunications network. A power supply 925, such as a battery or adapter for an alternating current or direct current power source, provides power to system 900.

Non-transitory computer-readable media may be any available media that can be accessed by processor 910 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor 910 is further coupled via bus 905 to a display 930, such as a Liquid Crystal Display ("LCD"), for displaying information to a user. For certain computing systems, such as simpler versions of a recording device, a display may not be present. Buttons/keyboard 935 and a cursor control device 940, such as a computer mouse or a touch pad, are further coupled to bus 905 to enable a user to interface with system 900. However, in certain embodiments such as those for mobile computing implementations, a physical keyboard and mouse may not be present, and the user may interact with the device solely through display 930, buttons, and/or a touchpad (not shown). Any type and combination of input devices may be used as a matter of design choice.

In one embodiment, memory 915 stores software modules that provide functionality when executed by processor 910. The modules include an operating system 945 for system 900. The modules further include a voice memo module 950 that is configured to store/transfer voice memos and/or receive and process voice memos, depending on the type of computing system (e.g., a recording device versus a mobile phone). System 900 may include one or more additional functional modules 955 that include additional functionality.

One skilled in the art will appreciate that a "system" could be embodied as a personal computer, a server, a console, a personal digital assistant ("PDA"), a mobile phone, a tablet computing device, a recording device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a non-transitory computer-readable medium, which may be, for instance, a hard disk drive, flash device, random access memory ("RAM"), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The method steps performed in FIGS. 4-6 may be performed by a computer program, encoding instructions for the nonlinear adaptive processor to perform at least the methods described in FIGS. 4-6, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the methods described in FIGS. 4-6, which may also be stored on the non-transitory computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Throughout this disclosure, the terms "application" and "software application" are used. These terms are defined as an executable program that is configured to be run by a computing system. In some cases, "application" and "software application" may be synonymous with "module". It should be understood that pure hardware implementations, and implementations using a combination of hardware and software, may also be used, although such implementations are likely to be less flexible and more costly.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
recording, by a recording device, a voice memo from a user via a microphone and storing the recorded voice memo in memory;
searching, by the recording device, for a compatible computing system running a voice memo processing application to transfer the recorded voice memo to;
when the computing system is detected, transferring the recorded voice memo, by the recording device, to the computing system;
translating the voice memo, by the computing system, into a computer-readable format representing textual representation of the voice memo;
parsing, by the computing system, the translated voice memo;
determining, by the computing system, a type of software application from a plurality of software application types to which the voice memo pertains via a preamble, a keyword, or a keyphrase in the translated voice memo, wherein the type is a category of the software application;
creating an item, by the computing system, based on the translated voice memo within the voice memo processing application; and
applying the created item, by the computing system, to a plurality of different software applications of the same determined type on the recording device.

2. The computer-implemented method of claim 1, further comprising:
tracking, by the recording device, a time and date that the voice memo was recorded and a length of playing time of the voice memo.

3. The computer-implemented method of claim 1, wherein the transfer of the recorded voice memo occurs via a Bluetooth protocol.

4. The computer-implemented method of claim 1, further comprising:
searching, by the recording device, for the compatible computing system by periodically checking whether the compatible computing system is in range.

5. The computer-implemented method of claim 1, further comprising:
searching for the computing system, by the recording device, responsive to manual input.

6. The computer-implemented method of claim 1, further comprising:
automatically deleting the stored voice memo from memory, by the recording device, after transferring the voice memo to the computing system.

7. The computer-implemented method of claim 1, further comprising:
synchronizing the created item, by the recording device, with one or more other computing systems.

8. The computer-implemented method of claim 1, wherein the recording device comprises a strap, an elastic band, or a clip configured to be secured around a user's wrist, clip to clothing, and/or attach to a belt.

9. The computer-implemented method of claim 1, wherein the recording device comprises:
a body comprising a microphone and at least one button; and
a strap operably connected to the body, wherein
the microphone is configured to record audio from the user, and the at least one button is configured to start and stop recording of the voice memo, and to transfer the recorded voice memo to the computing system.

10. A computer-implemented method, comprising:
searching, by a recording device, for a compatible computing system to transfer the recorded voice memo to;
when the compatible computing system is detected, transferring the recorded voice memo, by the recording device, to the computing system;
translating the voice memo, by the computing system, into a computer-readable format representing textual representation of the voice memo prior to sending the translated voice memo;
parsing, by the computing system, the translated voice memo;
sending, by the computing system, the translated voice memo to the recording device;
determining, by the recording device, a type of software application of the plurality of software types to which the voice memo pertains via a preamble, a keyword, or a keyphrase in the translated voice memo, wherein the type is a category of the software application;
creating, by the recording device, an item based on the translated voice memo within a voice memo processing application; and
applying the created item, by the recording device, to a plurality of different software applications of the same determined type on the recording device.

11. The computer-implemented method of claim 10, further comprising:
determining, by the computing system, at least one additional keyword or keyphrase pertaining to the item; and
incorporating, by the computing system, content designated by the at least one additional keyword or keyphrase into the item.

12. The computer-implemented method of claim 10, wherein the type of the software application comprises an email application, a calendar application, a notepad application, or a reminder application.

13. The computer-implemented method of claim 10, further comprising:
synchronizing, by the computing system, the created item with a corresponding software application on at least one other computing system.

14. The computer-implemented method of claim 10, further comprising:
determining, by the computing system, whether a special word or phrase precedes a keyword or keyphrase; and
designating, by the computing system, the keyword or keyphrase as general memo content when the special word or phrase precedes the keyword or keyphrase.

15. A system, comprising:
a computing system;
a mobile recording device; and
another mobile device running a voice memo processing application, wherein the mobile recording device is configured to:
record a voice memo from a user and store the voice memo,
search for the other mobile device in order to transfer the recorded voice memo, and
transfer the recorded voice memo to the other mobile device that then transfers the recorded voice memo to the computing system,
the computing system is configured to:
translate the transferred voice memo into a computer-readable format representing textual representation of the voice memo prior to sending the translated voice memo,
parse the translated voice memo, and
send the translated voice memo to the other mobile device, and
the other mobile device is configured to:
receive the translated voice memo from the computing system,
determine a type of software application of the plurality of software application types to which the voice memo pertains via a preamble, a keyword, or a keyphrase in the translated voice memo, wherein the type is a category of the software application,
create an item based on the translated voice memo within the voice memo processing application, and
synchronize the created item for the same determined software application type with one or more other computing systems.

16. The system of claim 15, wherein the other mobile device is further configured to search for the computing system by periodically checking whether the computing system is in range.

17. The system of claim 15, wherein the mobile recording device is further configured to automatically delete the stored voice memo after transferring the voice memo to the computing system.

18. The system of claim 15, wherein the computing system comprises a server.

19. The system of claim 15, wherein the other mobile device is further configured to:
determine at least one additional keyword or keyphrase pertaining to the item; and
incorporate content designated by the at least one additional keyword or keyphrase into the item.

20. The system of claim 15, wherein the computing system is further configured to:
determine whether a special word or phrase precedes a keyword or keyphrase; and
designate the keyword or keyphrase as general memo content when the special word or phrase precedes the keyword or keyphrase.

21. The system of claim 15, wherein the other mobile device is a cell phone.

* * * * *